United States Patent
Enomoto et al.

(10) Patent No.: US 6,481,089 B1
(45) Date of Patent: Nov. 19, 2002

(54) METHOD FOR MANUFACTURING AN ELECTROMOTIVE MACHINE HAVING AN INSULATED COIL

(75) Inventors: Yuji Enomoto; Noriaki Yamamoto; Yukinori Taneda, all of Yokohama; Suetaro Shibukawa, Hitachinaka; Osamu Koizumi, Higashiibaraki-gun; Fumio Tajima, Taga-gun, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/054,217

(22) Filed: Apr. 2, 1998

(30) Foreign Application Priority Data

Apr. 9, 1997 (JP) .............................................. 9-091059

(51) Int. Cl.[7] .......................... H02K 15/00; B02D 5/12
(52) U.S. Cl. .......................................... 29/596; 427/116
(58) Field of Search .......................... 29/596, 578, 608, 29/458; 310/208, 43, 45; 336/205, 206; 427/116, 185

(56) References Cited

U.S. PATENT DOCUMENTS 2,970,936 A * 12/1961 Ricahrdson
3,775,628 A * 11/1973 Anderson et al. ........... 310/208
4,616,407 A * 10/1986 Tamaki et al. ................ 29/596
5,787,567 A * 8/1998 Miyazaki ..................... 29/596
6,120,114 A * 9/2000 Blazic et al. ............. 303/119.2

FOREIGN PATENT DOCUMENTS

JP 53-100402 9/1978
JP 408212855 A * 8/1996

* cited by examiner

*Primary Examiner*—S. Thomas Hughes
*Assistant Examiner*—John C. Hong
(74) *Attorney, Agent, or Firm*—Mattingly, Stanger & Malur, P.C.

(57) ABSTRACT

A method for manufacturing an insulated coil for use in an electromotive machine includes an aligning and winding step for forming a coil by aligning and winding a wire coated with insulating material; an insulator forming step for winding or coating an insulator around a slot inserting portion of the coil which is formed in the aligning and winding step and applying an adhesive layer between the insulator and the slot inserting portion; and a shaping step for shaping and fixing the wire and the insulator of the slot inserting portion into a unit through melting by increasing the temperature thereof and thereafter cooling the adhesive layer of the slot inserting portion 12, around which the insulator is wound or coated and applying the adhesive layer therebetween in the insulator forming step, under a restrained condition using a shaping metal mold.

4 Claims, 5 Drawing Sheets

METHOD FOR MANUFACTURING AN ELECTROMOTIVE MACHINE HAVING AN INSULATED COIL

BACKGROUND OF THE INVENTION

1. Field of the Invention

The present invention relates to electromotive machines and particularly to electromotive machines including electric motors, such as an induction motor, a synchronous motor, etc., as well as to a method for manufacturing an electromotive machine have insulated coils.

2. Description of Related Art

In the construction of an induction motor or a synchronous motor, a stator and a rotor are used. The stator is constructed by inserting a large number of coils into respective slots which are provided on a core. As a method for manufacturing such the stator, a so-called inserter method already has been known and applied, particularly in a small-sized electric motor, as is disclosed in Japanese Laid-Open Patent No. 53-100402 (1978), in which a coil wound previously in a predetermined shape is set in a coil guide by "a blade" and is pushed into the slot of the core by a jig for stuffing. An electric insulation between the coils and the core in that structure is obtained by applying a method, in which, as shown in FIG. 8, in addition to the insulator coating of a wire, a slot insulating paper 62 is previously disposed on an interior surface of the slot 61 of the core and then the coil 63 is inserted therein.

In a field of a large-sized electric motor, the coil insertion is worked out by hand, i.e., inserting a coil 64 which is shaped previously into a slot of a core. An electric insulation between the coils and the core in that structure is obtained, as is shown in FIGS. 9 (a) and (b), by taping an electric insulator 65 and 66 around the coil 64.

In a small-sized electric motor, since the slot insulating paper is provided in the slot previously, a gap or an aperture is formed between the slot insulating paper and the core, as well as a certain degree of the gap or aperture must be formed among the wires forming the coils so as to insert the coils onto the slot insulating paper provided in the slot. As a result of this, a space factor (i.e., a ratio of an electric conductor a space occupying within a slot in the cross section thereof) decreases.

In a large-sized electric motor, the coil is wound with the insulator not only once but also wound twice in a portion thereof in a previous step or process of the taping, therefore, the size of the coil fluctuates in a cross-section thereof. In a relationship between the slot size of the core, the portion which is largest in the size of the cross-section must be less than the slot size, and other portions thereof are smaller than that. Therefore, the space factor of the slot is decreased. Further, the fluctuation in the size of the cross-section also brings a problem of causing difficulty in the insertion of the coil into the slot.

SUMMARY OF THE INVENTION

An object of the present invention is solve the drawbacks mentioned above and to provide a method for manufacturing an insulated coil, by which the space factor of the slot can be improved, with high accuracy in cross-sectional size of a coil portion to be inserted into the slot, as well as, improving assembly of the coil inserted into the slot.

Another object of the present invention is to provide a method for manufacturing an insulated coil, with which small-sizing of the rotating electromotive machines, including electric motors can be realized by improving the space factor and efficiency thereof.

Moreover, another object of the present invention is to provide rotating electromotive machines including electric motors, with which small-sizing can be realized by improving the space factor and efficiency thereof.

For achieving the objects mentioned above, in accordance with the present invention, there is disclosed a method for manufacturing an insulated coil comprising the steps of: an aligning and winding step for forming a coil by aligning and winding a wire which is coated with insulating material thereon; an insulator forming step for winding or coating an insulator around a portion of said coil to be inserted into a slot, which is formed in said aligning and winding step, laying an adhesive layer or agent therebetween; and a shaping step for shaping and fixing said wire and said insulator in the slot inserting portion as an unit, through melting by increasing the temperature thereof and thereafter cooling said adhesive layer or agent of said slot inserting portion, around which the insulator is wound or coated, laying the adhesive layer or agent therebetween in said insulator forming step, under a restrained condition using a metal mold for shaping.

Further, in accordance with the present invention, there is provided a method for manufacturing an insulated coil comprising, winding an insulator around a slot inserting portion of the coil after winding thereof, and shaping and fixing said wire and said insulator as an unit, through melting an outer periphery of the insulator coating of the wire or an adhesive layer on an interior surface of the insulator by increasing the temperature thereof and thereafter cooling it, keeping a restrained condition onto the slot inserting portion of the coil using a metal mold for shaping having an interior periphery size equal to the size of the finally finished coil.

Furthermore, in accordance with the present invention, there is provided method for manufacturing an insulated coil comprising the steps of: an aligning and winding step for forming a coil by aligning and winding a wire which is coated with insulating material thereon; an insulator forming step for winding or coating an insulator around a portion of said coil to be inserted into a slot, which is formed in said aligning and winding step, in a condition of forming an adhesive layer or agent on an outer peripheral surface of insulating material coating which is coated on said wire; and a shaping step for shaping and fixing said wire and said insulator in the slot inserting portion as a unit, through melting by increasing the temperature thereof and thereafter cooling said adhesive layer or agent of said slot inserting portion, around which the insulator is wound or coated laying the adhesive layer or agent therebetween in said insulator forming step, under a restrained condition using a metal mold for shaping.

Moreover, in accordance with the present invention, there is provided a method for manufacturing an insulated coil comprising the steps of: an aligning and winding step for forming a coil by aligning and winding an insulator coated wire, on an outer surface of which is formed an adhesive layer or agent; an insulator forming step for winding or coating insulator around a portion of said coil to be inserted into a slot, which is formed in said aligning and winding step; and a shaping step for shaping and fixing said wire and said insulator in the slot inserting portion as an unit, through melting by increasing the temperature thereof and thereafter cooling said adhesive layer or agent of said slot inserting portion, around which the insulator is wound or coated, laying the adhesive layer or agent therebetween in said insulator forming step, under a restrained condition with using a metal mold for shaping.

Further, in accordance with the present invention, there is provided a method for manufacturing an insulated coil comprising the steps of: an aligning and winding step for forming a coil by aligning and winding a wire which is coated with insulating material thereon; an insulator forming step for winding or coating an insulator, on an interior surface of which is formed an adhesive layer or agent, around a portion of said coil to be inserted into a slot, which is formed in said aligning and winding step; and a shaping step for shaping and fixing said wire and said insulator in the slot inserting portion as a unit, through melting by increasing the temperature thereof and thereafter cooling said adhesive layer or agent of said slot inserting portion, around which the insulator is wound or coated laying the adhesive layer or agent therebetween in said insulator forming step, under a restrained condition using a metal mold for shaping.

Further, in accordance with the present invention, in a method for manufacturing the insulated coil mentioned above, the melting temperature of said adhesive layer or agent is lower the heat-resisting temperature of said insulator coating and of the insulator. Further, in the method for manufacturing the insulated coil mentioned above, the adhesive layer or agent is thermoplastic resin. Furthermore, in the method for manufacturing the insulated coil mentioned above, the insulator is made of aramid paper or of prepreg insulating sheet material.

Further, in accordance with the present invention, there is provided an electromotive machine comprising a slot, into which is inserted a slot inserting portion of an insulated coil manufactured by the method for manufacturing an insulated coil as mentioned above.

Further, in accordance with the present invention, there is provided a rotating electromotive machine comprising a stator core having a slot, into which is inserted the slot inserting portion of the insulated coil manufactured by the method for manufacturing an insulated coil as mentioned above.

Further, in accordance with the present invention, there is provided an electric motor comprising a stator core having a plurality slots, into which are inserted the slot inserting portions of insulated coils for U-phase, V-phase and W-phase, which are manufactured by the method for manufacturing an insulated coil as mentioned above.

In accordance with the above-mentioned construction, it is possible to enhance the accuracy in sizes of a cross-section of the coil including the insulator, and as a result it is also possible to increase the space factor of the slot of the stator, thereby realizing small-sizing of the rotating electromotive machines including electric motors, as well as improving the efficiency thereof.

Further, in accordance with the above construction, it is possible to enhance the accuracy in sizes of a cross-section of the coil including the insulator, and as a result, it is also possible to reduce the cost of the material, for example, by reducing amount of conductor used therein.

Further, in accordance with the above construction, since the electric motor constitutes a key part in a set product, it is possible to realize a smaller sized, lighter weight and lower priced product using the electric motor.

DESCRIPTION OF THE PREFERRED EMBODIMENTS

Figure 1A:
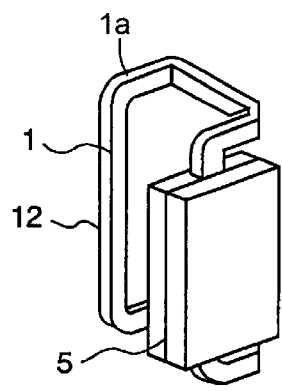
FIGS. 1(*a*) through (*e*) are diagrams explaining an embodiment of a method for manufacturing an insulated coil in accordance with the present invention.
Figure 1B:
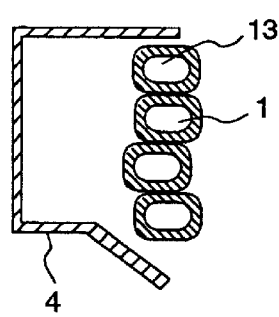

Hereinafter, a detailed explanation of the embodiments according to the present invention will be given by referring to the drawings.

Figure 2:
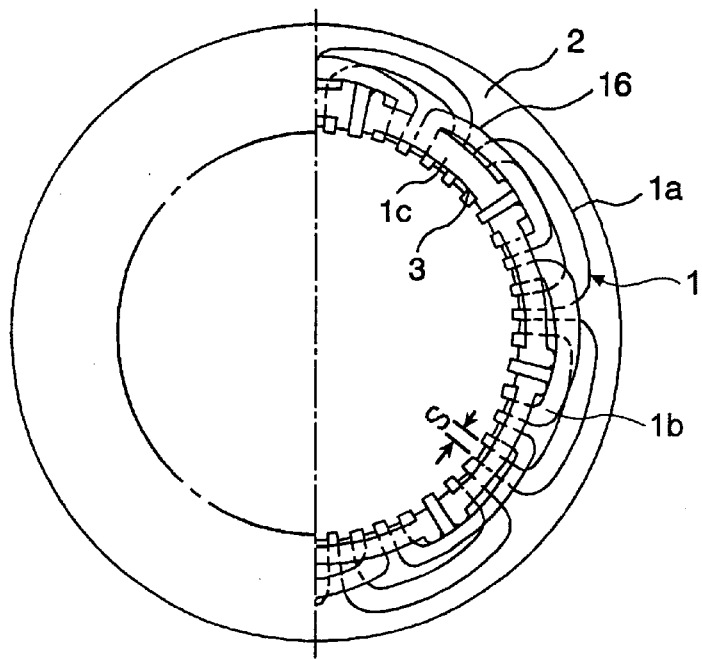
FIG. 2 is a diagram showing shapes of a stator core and insulated coils inserted into slots thereof.

An electric motor, such as an induction motor or a synchronous motor, in accordance with the present invention, is constructed with a stator and a rotor, and as shown in FIG. 2, the stator has a core 2 and a coil 1 which is inserted into a large number of slots provided in the core 2.

Figure 7A:
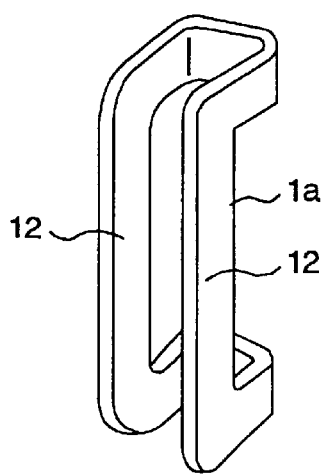
FIGS. 7(*a*) through (*c*) show shapes of a U-coil, a V-coil and used a W-coil which are inserted into a slots of the stator core constructing a three-phase electric motor in accordance with the present invention.
Figure 7B:
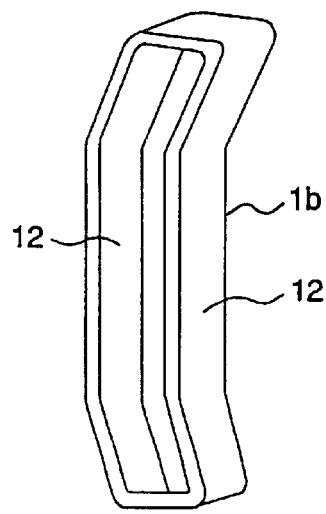
Figure 7C:
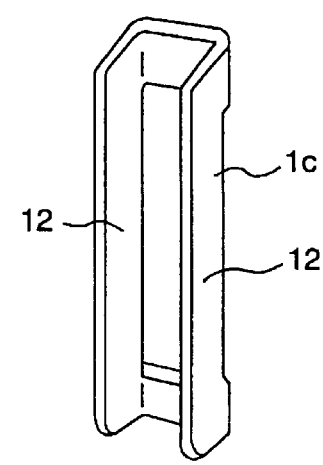
Figure 8:
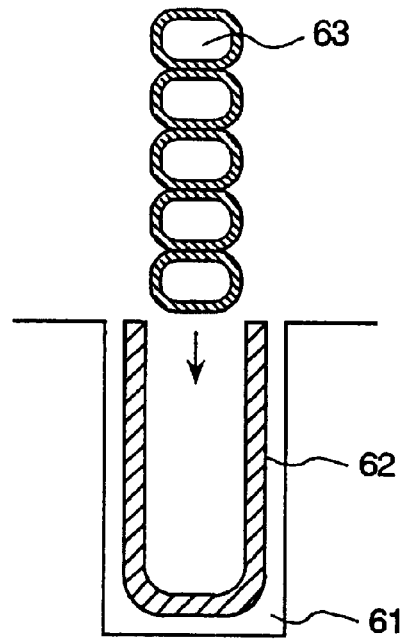
FIG. 8 shows an example of slot insulation in the stator core of a conventional small-sized electric motor.
Figure 9A:
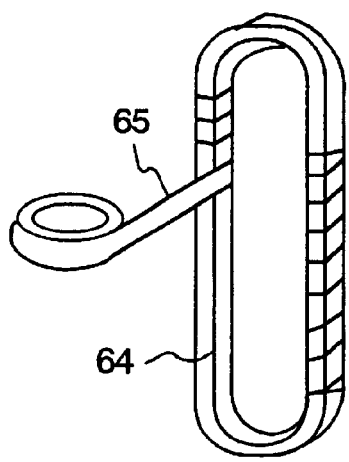
FIGS. 9(*a*) and (*b*) show an example of coil insulation by taping in a conventional large-sized electric motor.
Figure 9B:
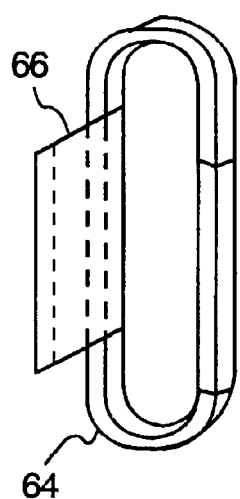

In FIG. 2 is shown a stator for a three (3) phase motor, having 48 slots and eight (8) poles. In this case, the coil 1 is constructed with coils for a three phase motor, i.e., a U-coil 1*a* having a shape shown in FIG. 7(*a*), a V-coil 1*b* having a shape shown in FIG. 7(*b*), and a W-coil 1*c* having a shape shown in FIG. 7(*c*). The stator core 2 is formed by laminating electromagnetic steel plates, i.e., silicon steel plates, which are punched by a press. The slot 3 in which the coil 1 is inserted is made in a shape of an open slot, having a slot width s at an opening near to the center of the core being smaller than the maximum slot width.

Figure 6A:
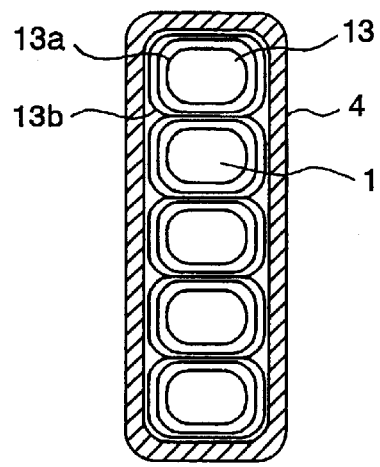
FIGS. 6(*a*) and (*b*) show cross-sectional views of the slot inserting portions of coils, each of which is wound or coated with an insulator.
Figure 6B:
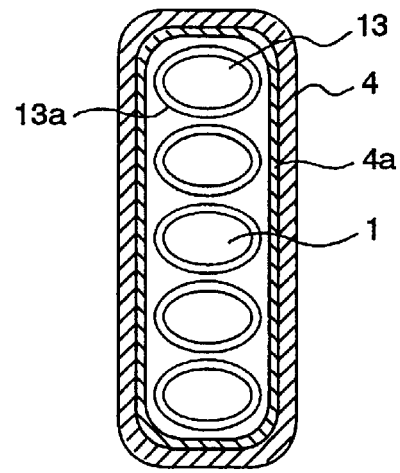

In FIG. 1, there is shown an embodiment of a method for fusing the coil using the insulator as an unit, in accordance with the present invention. First, a wire such as an enameled wire is aligned and wound to form a coil 1 having a predetermined shape as shown in FIG. 1(*a*). In FIG. 1(*a*), the U-coil 1*a* is shown as an example of the coil 1. Next, as shown in FIG. 1(*b*), an insulator 4 is wound or coated around a slot inserting portion 12 of the coil 1 being formed by aligning and winding thereof. In this instance, it is in such condition as shown in FIG. 6(*a*) or (*b*). Namely, since the coil 1 is in the condition of winding, each part of the coil is free relative to another part of the coil. In the case shown in FIG. 6(*a*), on an outer periphery of the insulator coating 13*a* of the electric wire(the wire) 13 is formed an adhesive layer (adhesive agent) 13*b*. Therefore, the adhesive layer (adhesive agent) 13*b* lies between the wound or coated insulator 4 and the insulator coating 13*a* of the electric wire 13 in the slot inserting portion 12. In the case shown in FIG.

6(b), the adhesive layer (adhesive agent) 4a is formed on an interior peripheral portion (interior surface) of the insulator 4. Therefore, the adhesive layer (adhesive agent) 4a lies between the wound or coated insulator 4 and the insulator coating 13a of the electric wire 13 in the slot inserting portion 12.

Figure 1C:
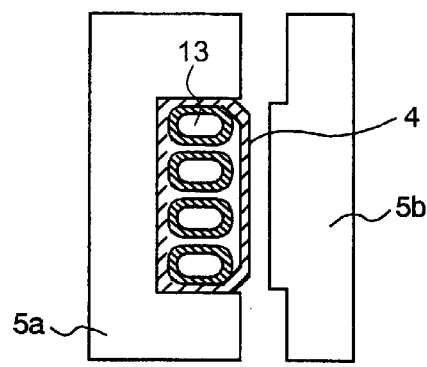
Figure 1D:
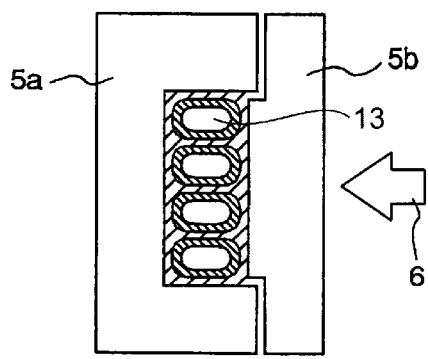

Next, the wire (the electric wire) 13 and the insulator 4 can be fixed and shaped as a unit, as shown in FIGS. 1(c) and (d), melting the adhesive layer 13b formed on the outer periphery of the insulator coating 13a of the electric wire 13 or the adhesive layer 4a formed on the interior peripheral portion (interior surface) of the insulator 4 and thereafter by cooling the adhesive layer 13b or 4a so as to harden it, by increasing the temperature so that the adhesive layer 13b formed on the outer periphery of the insulator coating 13a of the electric wire 13 or the adhesive layer 4a formed on the interior peripheral portion (interior surface) of the insulator 4 begins melting, with a method of increasing the temperature by Joule heat through conducting current into the coil or another method of heating the coil itself in a high temperature furnace, with applying and keeping a restrained condition onto the slot inserting portion 12 of the coil 1 on which the insulator 4 is wound or coated by a shaping metal mold 5a or 5b having an interior periphery size equal to a size of the finally finished coil, as shown in FIGS. 1(c) and (d). Namely, for fixing the wire (electric wire) 13 and the insulator 4 as a unit on the slot inserting portion 12 of the coil 1 by using the shaping metal mold 5a and 5b, the adhesive film 13b or 4a must be formed by painting it on the outer periphery of the coating layer 13a of the wire 13 or the interior periphery of the insulator 4, thereby locating the adhesive layer 13b or 4a between the insulator 4 and the coating film 13a of the wire 13. The coil 1 can be formed by aligning and winding the wire 13, on the outer periphery of the coating film 13a of which is formed the adhesive layer (or agent) 13b. However, the wire 13 being formed with the adhesive layer thereon is higher in price comparing to that without the adhesive layer.

Figure 1E:
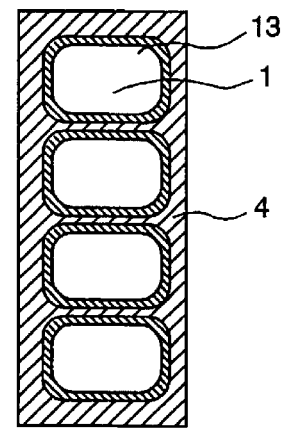
Figure 3:
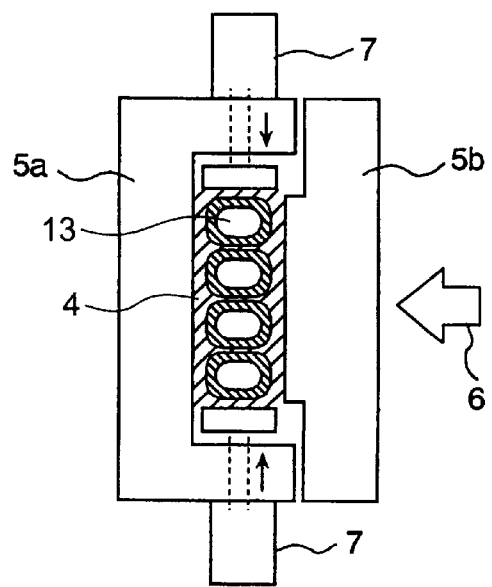
FIG. 3 is a diagram showing an embodiment for shaping a slot inserting portion of the coil by using a mold for shaping different from that shown in FIGS. 1(*a*) through (*e*)

Taking out the coil 1 from the shaping metal mold 5a and 5b after hardening, the cross-section of the slot inserting portion 12 of the coil 1 is shaped to a high accuracy by the interior configuration of the shaping metal mold 5a and 5b, and as shown in FIG. 1(e), being rectangular uniformly over the whole length of the slot inserting portion 12. However, as shown in FIGS. 1(c) and (d), the shaping metal mold 5a and 5b is so constructed that the shaping metal mold 5a has a gutter or motor of a rectangular shape and the shaping metal mold 5b has a projection corresponding to the gutter so as to give a compressing force in a direction of the width of the coil as shown by an arrow 6. Further, as is shown in FIG. 3, it is also possible to add a function of applying a pressure force by pressure force means 7 in a direction of alignment of the wire 13, thereby shaping the cross-section of the slot inserting portion to be rectangular and fixing the wire (electric wire) 13 and the insulator 4 as a unit.

As the adhesive layer 13b of the electric wire 13, ordinarily, a thermoplastic resin of an epoxy group or a nylon group is used, and those which can obtain enough adhesive strength among the wires in the temperature from 140° C. to 160° C. are available on a market. Further, as the insulator 4 must be able to resist high temperature, an aramid paper (a paper made of aromatic polyamid fiber), a mica paper, a prepreg insulating material (a sheet of insulating materiel obtained by dipping and hardening a resin with a reinforcing material of glass cloth), a PET (polyethylene terephthalate) resin film, a PPS (polyphenylene sulfide) resin film, etc., are ordinarily used. Therefore such a step is taken that the adhesive layer 4a of the thermoplastic resin mentioned above is painted on the surface thereof with thickness from 0.01 to 0.03 mm. Furthermore, the aramid paper and the PPS resin film man be used by being piled on each other, and in such a case, it is also possible to fuse more than two kinds of things such as the coil 1 and the insulator 4, into a unit under the condition of restraining them with the shaping metal mold 5a and 5b.

As explained above, the slot inserting portion 12 of each of U-coil 1a, V-coil 1b and W-coil 1c is shaped into an unit being fixed together through the adhesive layer 13b or 4a with the insulator 4, by means of the shaping 7metal mold 5a and 5b.

Figure 4:
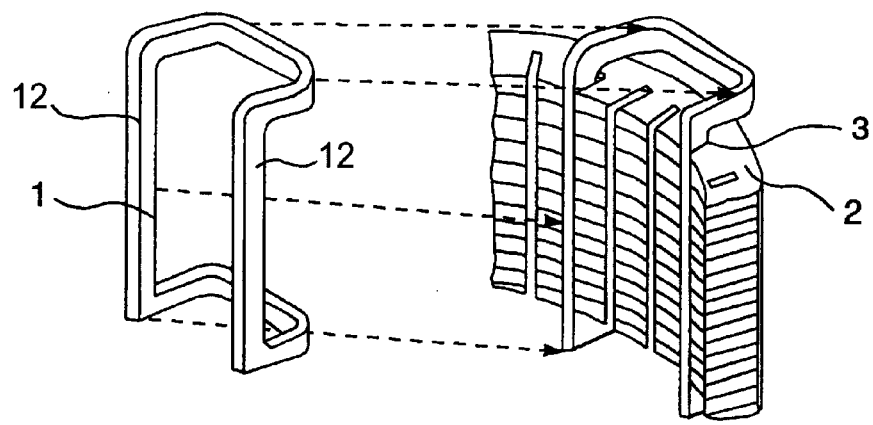
FIG. 4 is a diagram showing an embodiment in which the slot inserting portion of the coil, which is shaped by using the mold for shaping in accordance with the present invention, is inserted into the slot.

In this manner, the U-coil 1a, V-coil 1b and W-coil 1c, each having the slot inserting portion 12 which is shaped into a unit by fixing through the. adhesive layer 13b or 4a with the insulator 4, are assembled by positioning them within an inner diameter of the core 2 and inserting them into the corresponding core slots 3 at the respective slot inserting portion 12 thereof, sequentially, as is shown in FIG. 4. The construction is such that slot wedges are inserted so as to protect the inserted coils 1a, 1b and 1c from jumping out from the open slots 3 into an inner diameter side of the core. These slot wedges can be made of such sheet insulating materials as mentioned above.

Figure 5:
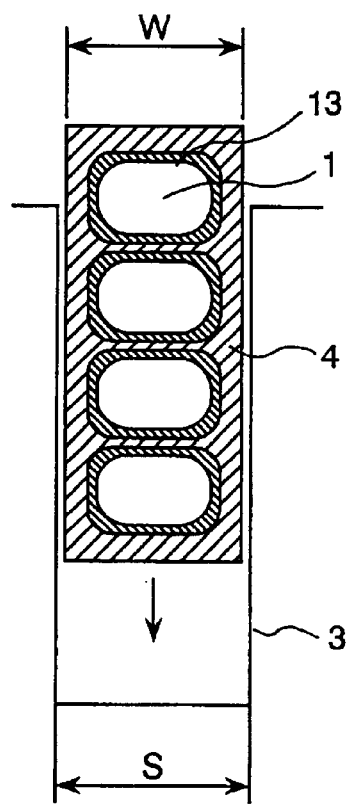
FIG. 5 is a diagram showing a condition in which the slot inserting portion of the coil, which is shaped by using a mold for shaping in accordance with the present invention, is inserted into a slot.

As is explained in the above, by applying the method of fusing and shaping the coil as an unit with the insulator 4, as shown in FIGS. 4 and 5, it is possible to keep the relationship between the width s of the core slot and the width w of the coil within a constant range in accuracy, when the slot inserting portion 12 of the coil 1 is positioned within the inner diameter of the core 2 and is inserted into the core slot 3 corresponding thereto. Thereby a ratio of the cross-section of the conductor with respect to that of the core slot, i.e., the space factor can be determined from the beginning of the designing of motors without consideration of a margin. As a result of this, it is possible to increase the space factor of the slot as much as possible.

Further, the increase in accuracy in the slot inserting portion 12 of the coil 1 makes the insertion (assembling) easy and shortens the time for assembling.

In accordance with the present invention, it is possible to increase the accuracy of the cross-section size of the coil including the insulator. As a result of this, the space factor of the slot can be improved. Therefore, it has an effect that the electric motor is smaller and the efficiency thereof is increased.

Further, in accordance with the present invention, it is possible to increase the accuracy of the cross-section size of the coil including the insulator by reducing an amount of conductor to be used. It is also possible to obtain a reduction of the price of materials.

Moreover, in accordance with the present invention, since the electric motor is a key part of a set product, it is possible to realize a smaller sized, lighter weight and lower priced product using the electric motor, as well as to obtain an improvement in the efficiency of the electric motor.

What is claimed is:

1. A method for manufacturing an electromotive machine having a plurality of insulated coils, comprising the steps of:
   an aligning and winding step for forming the plurality of coils by aligning and winding wires, each of which wire is coated with insulating material;
   an insulator forming step including winding or coating an insulator of aramid paper, mica paper, prepreg insulating material, polyethylene terephthalate resin film or polyphenylene sulfide resin film around a whole portion of each of said coils to be inserted into slots of said electromotive machine, and applying an adhesive layer of thermoplastic resin of an epoxy group or a nylon group between said insulator and said whole portion;

a shaping step for shaping and fixing said wire and said insulator as a unit including a slot inserting portion thereof, shaping the cross-section of said slot inserting portion to be rectangular, through melting said adhesive layer by increasing a temperature thereof through conducting current into said coil and thereafter cooling said adhesive layer of said slot inserting portion, around each part of the coil which the insulator is wound or coated to secure said insulator to the coil, in said insulator forming step, under a restrained condition using a metal mold for shaping, said adhesive layer being a thermoplastic material; and an inserting step for inserting said coils, each being shaped as a unit in said shaping step, into the slots of said electromotive machine.

2. A method for manufacturing an electromotive machine having a plurality of insulated coils, comprising the steps of:

an aligning and winding step for forming the plurality of coils by aligning and winding wires, each of which wire is coated with insulating material;

an insulator forming step for winding or coating an insulator of aramid paper, mica paper, prepreg insulating material, polyethylene terephthalate resin film or polyphenylene sulfide resin film around a whole portion of each of said coils to be inserted into slots of said electromotive machine, said insulator forming step including forming an adhesive layer of thermoplastic resin of an epoxy group or a nylon group on an outer peripheral surface of said insulating material which is coated on said wires; and a shaping step for shaping and fixing said wire and said insulator as a unit including a slot inserting portion thereof, shaping the cross-section of said slot inserting portion to be rectangular, through melting said adhesive layer by increasing a temperature thereof through conducting current into said coil and thereafter cooling said adhesive layer, around each part of the coil which the insulator is wound or coated to secure said insulator to the coil, in said insulator forming step, under a restrained condition using a metal mold for shaping, said adhesive layer being a thermoplastic material; and an inserting step for inserting said coils, each being shaped as a unit in said shaping step, into the slots of said electromotive machine.

3. A method for manufacturing an electromotive machine having a plurality of insulated coils comprising the steps of:

an aligning and winding step for forming the plurality of coils by aligning and winding insulator coated wires, on each outer surface of which is formed an adhesive layer of thermoplastic resin of an epoxy group or a nylon group;

an insulator forming step for winding or coating an insulator of aramid paper, mica paper, prepreg insulating material, polyethylene terephthalate resin film or polyphenylene sulfide resin film around a whole portion of each of said coils to be inserted into slots of said electromotive machine;

a shaping step for shaping and fixing said wire and said insulator as a unit including a slot inserting portion thereof, shaping the cross-section of said slot inserting portion to be rectangular, through melting said adhesive layer by increasing a temperature thereof through conducting current into said coil and thereafter cooling said adhesive layer, around which the insulator is wound or coated, in said insulator forming step, under a restrained condition using a metal mold for shaping, said adhesive layer being a thermoplastic material; and an inserting step for inserting said coils, each being shaped as a unit in said shaping step, into the slots of said electromotive machine.

4. A method for manufacturing an electromotive machine including a plurality of insulated coils, comprising the steps of:

an aligning and winding step for forming the plurality of coils by aligning and winding wires, each of which wire is coated with insulating material;

an insulator forming step for winding or coating an insulator of aramid paper, mica paper, prepreg insulating material, polyethylene terephthalate resin film or polyphenylene sulfide resin film, on an interior surface of which is formed an adhesive layer of thermoplastic resin of an epoxy group or a nylon group, around a whole portion of each of said coils to be inserted into slots of said electromotive machine, which are formed in said aligning and winding step;

a shaping step for shaping and fixing said wires and said insulator as a unit including a slot inserting portion thereof, shaping the cross-section of said slot inserting portion to be rectangular, through melting said adhesive layer by increasing a temperature thereof through conducting current into said coil and thereafter cooling said adhesive layer in said insulator forming step, under a restrained condition using a metal mold for shaping, said adhesive layer being a thermoplastic material; and an inserting step for inserting said wires, each being shaped as a unit in said shaping step, into the slots of said electromotive machine.

\* \* \* \* \*